United States Patent
Erdodi et al.

(10) Patent No.: US 9,527,961 B2
(45) Date of Patent: Dec. 27, 2016

(54) TELECHELIC N-ALKYLATED POLYAMIDE POLYMERS AND COPOLYMERS

(71) Applicant: Lubrizol Advanced Materials, Inc., Wickliffe, OH (US)

(72) Inventors: Gabor Erdodi, Cleveland, OH (US); Naser Pourahmady, Solon, OH (US); John Ta-Yuan Lai, Broadview Heights, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 14/766,902

(22) PCT Filed: Feb. 3, 2014

(86) PCT No.: PCT/US2014/014422
§ 371 (c)(1),
(2) Date: Aug. 10, 2015

(87) PCT Pub. No.: WO2014/126739
PCT Pub. Date: Aug. 21, 2014

(65) Prior Publication Data
US 2016/0002403 A1    Jan. 7, 2016

Related U.S. Application Data

(60) Provisional application No. 61/764,211, filed on Feb. 13, 2013.

(51) Int. Cl.
| C08G 69/28 | (2006.01) |
| C08G 69/00 | (2006.01) |
| C08G 69/26 | (2006.01) |
| C08G 69/34 | (2006.01) |
| C08G 69/36 | (2006.01) |
| C08G 69/40 | (2006.01) |
| C08G 69/44 | (2006.01) |

(52) U.S. Cl.
CPC .............. *C08G 69/28* (2013.01); *C08G 69/00* (2013.01); *C08G 69/26* (2013.01); *C08G 69/34* (2013.01); *C08G 69/36* (2013.01); *C08G 69/40* (2013.01); *C08G 69/44* (2013.01)

(58) Field of Classification Search
CPC ......... C08G 69/00; C08G 69/26; C08G 69/28; C08G 69/34; C08G 69/36; C08G 69/40; C08G 69/44
See application file for complete search history.

(56) References Cited

U.S. PATENT DOCUMENTS

| 3,839,245 A | 10/1974 | Schlossman et al. |
| 5,126,429 A | 6/1992 | Koehler et al. |
| 2010/0056682 A1* | 3/2010 | Meltzer .............. C08G 18/3206 524/315 |

FOREIGN PATENT DOCUMENTS

EP        0089846 A1    9/1983

OTHER PUBLICATIONS

A.L. Klebanskii, M.S. Vielesa: "A Study in the Field of Synthesis of N-Alkyl Derivatives of Hexamethylenediamine and Their Polycondensation, VII. Preperation of Completely N-alkylated Polyamides and Coupling of Their Chains With a Diisocyanate"; J. Gen. Chem USSR; vol. 28, 1958; pp. 1824-1828, XP9178700.
Chapman T M et al: "Polyurethane Elastomers With Hydrolytic and Thermooxidative Stability. \II Polyurethanes With N-Alkylated Soft Blocks", Journal of Polymer Science, Polymer Chemistry Edition, Interscience Publishers, New York, NY, US; vol. 28, No. 13, Dec. 1, 1990 (Dec. 1, 1990) pp. 3685-3699; XP000174684, ISSN: 0360-6376.
Xuming Chen et al: "Polyamides Derived From Piperazine and Used for Hot-Melt Adhesives: Synthesis and Properties"; International Journal of Adhesion and Adhesives, vol. 22, No. 1, Jan. 1, 2002 (Jan. 1, 2002), pp. 75-79. XP055115452,ISSN: 0143-7496.

* cited by examiner

*Primary Examiner* — Shailendra Kumar
(74) *Attorney, Agent, or Firm* — Samuel B. Laferty, Esq.; Teresan W. Gilbert, Esq.

(57) ABSTRACT

Low glass transition temperature polyamide oligomers or telechelic polyamides are formed from monomers forming tertiary amide linkages. These polyamides can be used with co-reactants to form high molecular weight or crosslinked polymers with desirable polyamide properties.

19 Claims, No Drawings

TELECHELIC N-ALKYLATED POLYAMIDE POLYMERS AND COPOLYMERS

This application is a 371 of PCT/US2014/014422, filed on Feb. 3, 2014, Which claims benefit of 61/764,211, filed on Feb. 13, 2013.

FIELD OF INVENTION

The invention relates to telechelic polyamides that are liquid below about 70° C. and can be reacted into other polymeric materials to impart desirable properties. Many polyamides, e.g. the various nylon polymers, are solids at temperatures of below about 80° C. and thus would be difficult to homogenously react into other polymeric materials. N-alkylating the nitrogen atom of the polyamide or the nitrogen bearing precursor of the polyamide eliminates the hydrogen bonding making the polyamide of this disclosure lower melting and more soluble.

BACKGROUND OF THE INVENTION

Vol. 38 (October 1946) of Industrial and Engineering Chemistry, pp. 1016-1019 titled Melting Points of N-Substituted Polyamides, by authors B. S. Biggs, C. J. Frosch, and R. H. Erickson studies the effect substitution on a nitrogen of a polyamide and the correlation of the polyamide melting points with the degree and type of substitution.

A compilation titled Research in the Field of Synthesis of Condensation of a N-alkylated Hexamethylenediamine by authors A. L. Klebanskii and M. S. Vilesova (1957), comprising: VI. Synthesis of Polyamines Starting with N-Alkylated Hexamethylenediamine, Production of Partly N-alkylated Polyamides pp. 1820-1823 describing fundamental properties of polyamides (crystallinity, tensile strength, stability in organic solvents et al.); and VII. Preparation of Completely N-alkylated Polyamides and Coupling of Their Chains with a Diisocyanate pp. 1824-1828 describes lengthening of polyamide chains by coupling with diisocyanates.

U.S. Pat. No. 4,992,500 describes Aqueous Dispersions of Polyamides Emulsified with Rosin Derivatives.

Vol. 184 of Makromol. Chem. (1983) pp 1957-1965 discloses polymerization of a polyamide from N-methyldodecanelactam. Vol. 41 of Polymer (2000) pp 7653-7866 titled Crystallization Behavior of Poly(N-methyldodecano-12-lactam) discloses homopolymers of N-methyldodecano-12-lactam.

Vol. 28 of J. of Polym. Sci. Part A: Polym. Chem. (1990) pp 1473-1482 titled Polyurethane Elastomers with Hydrolytic and Thermoxidative Stability. I. Polyurethanes with N-Alkylated Polyamide Soft Blocks discloses polyurethanes with N-alkylated polyamide linkages.

Vol. 28 of J. of Polym. Sci. Part A: Polym. Chem. (1990) titled Polyurethane Elastomers with Hydrolytic and Thermoxidative Stability. II. Polyurethanes with N-Alkylated Polyamide Soft Blocks discloses copolyamides where the alkyl group on the amine is methyl, ethyl, isopropyl, or butyl and the diacid is a carbonate.

U.S. Pat. No. 5,610,224 discloses an ionic and nonionic polyamide modified polyurethane polymers for use in coating compositions, method for forming, and coating compositions containing these polymers.

EP 594 292 A1 describes N-alkylated aminoalcohols reacted with a lactone. That reaction product is reacted with a diester of a dicarboxylic acid or an anhydride of a dicarboxylic acid.

U.S. Pat. No. 7,276,570 titled Compositions for Golf Equipment and assigned to Acushnet Company discloses golf balls comprising thermoplastic, thermoset, castable, or millable elastomer compositions comprising at least one polymer having a plurality of anionic moieties attached thereto. The compositions can be used as part of golf ball construction.

Vol. 22 of International J. of Adhesion & Adhesives (2002) pp 75-79 titled Polyamides Derived from Piperazine and Used for Hot-melt Adhesives: Synthesis and Properties discloses copolymers of piperazine with ethylene diamine and dimeric fatty acids.

WO2006/053777 A1 to Novartis Pharma Gmbh discloses crosslinkable poly(oxyalkylene) containing polyamide prepolymers that can be used to provide water-soluble prepolymers that can be used as a component in contact lenses.

US 2008/0090956 A1 discloses water-dilutable, hydroxyfunctional polyurethanes containing amide structural units, a process for preparing them, and aqueous coating compositions prepared from them.

US 2008/0223519 (equivalent WO2008/070762) titled Polyamide Polyols and Polyurethanes, Methods for Making and Using, and Products Made Therefrom discloses reaction products of a polymeric and non-polymeric diamine with dicarboxylic acid and hydroxy substituted carboxylic acid. It also discloses reactions of the polyamide with diisocyanates.

EP 449419 A1 describes reacting primary aminoalcohols with acid terminated polyamideethers to create hydroxyl terminated polymers.

SUMMARY OF THE INVENTION

This invention relates to low molecular weight polyamide oligomers and telechelic polyamides (including copolymers) comprising N-alkylated amide groups in the backbone structure. These polymers are useful as soft segments in the preparation of thermoplastic, thermoset, or elastomer resins and water-borne dispersions of those resins. The unique feature of these polyamide polymers is their ability to be processed as liquids at temperatures from 20 to 50 or 80° C., which makes them suitable for further reaction and polymerization forming various thermoplastic or thermoplastic elastomer compositions.

DETAILED DESCRIPTION OF THE INVENTION

Definitions

The following terms have definitions as stated below: Telechelic polymers, defined as macromolecules that contain two reactive end groups and are used as cross-linkers, chain extenders, and important building blocks for various macromolecular structures, including block and graft copolymers, star, hyperbranched or dendritic polymers. Telechelic polymers of the polydiene, polyester, polyether, and polycarbonate type are well known in the art. These prior art telechelic polymers with functional end groups selected from primary or secondary hydroxyl, primary or secondary amine, and carboxylic acid have been reacted with complimentary reactants to form larger polymers with the properties of telechelic precursors. Easy to process polyamide telechelics with low inciting points have not been available.

We will use the parentheses to designate 1) that the something is optionally present such that monomer(s) means monomer or monomers or (meth)acrylate means methacrylate or acrylate, 2) to qualify or further define a previously mentioned term, or 3) to list narrower embodiments.

Polyester polyols render good mechanical properties and UV resistance, but they suffer from poor hydrolysis resistance. Polyether polyols have better hydrolytic stability than polyesters, but fall short in UV resistance. Polycarbonate polyols offer improved hydrolysis resistance over polyesters with some degree of increased hardness, but they are an order of magnitude more expensive than other polyols. Polydiene polyols are useful but are too hydrophobic to interact well with polar substrates. Some polydiene polyols are hydrogenated to reduce degradation mechanisms relying on residual unsaturation from the diene monomer. Therefore, a new class of telechelic polyamide will help overcome these problems.

Amine terminated polyamide oligomers were made with low viscosity, low glass transition temperature, suppressed crystallinity, low acid number, with various nitrogen or amide:hydrocarbon weight ratios (or hydrophilic/hydrophobic balance), and with a controlled number of hydrogen bonding or non-hydrogen bonding amide groups.

A series of polyamide oligomers from conventional difunctional acids and amines were made. The initial oligomers contained amine terminations and in reaction with diisocyanates form polyamide-polyurea backbone. However, the presence of strong hydrogen bond in these structures makes them very hard (high glass transition) even at low molecular-weight and therefore not suitable for further structural modifications or preparation higher molecular weight polymers or crosslinked networks. We discovered that substitution of N-alkyl groups on these polymers make them soft and easy to process.

This invention relates to polyamide oligomers or telechelic polyamides resistant to chain scission, e.g. by hydrolysis or UV degradation, useful as macromonomers, prepolymers or polymer segments to make higher molecular weight polymers and/or crosslinked polymer networks. The resulting polymers or networks have better thermal stability than similar polymers or networks from polyethers and/or polyesters due to the higher thermal stability of the amide bonds. Polymers built from moderate molecular weight polyamide oligomers and co-reactants that can form chemical bonds with co-reactive groups at the termini of the oligomers. These polymers have many of the properties of the polyamide oligomers from which they are made as the oligomers form a substantial weight percent of the final polymer. Modifying the molecular weight and composition of the oligomers can be used to achieve the desired properties. They can also be used to make polyurea/urethanes. The term polyurea/urethane will be used to refer to polymers that have urea linkages, urethane linkages or blends of such linkages. The composition may contain small amounts of other polymers and materials either as physical blends or where the other polymers or materials may be co-reacted into the polyamide.

The term polyamide oligomer will refer to an oligomer with two or more amide linkages, or sometimes the amount of amide linkages will be specified. A subset of polyamide oligomers will be telechelic polyamides. Telechelic polyamides will be polyamide oligomers with high percentages, or specified percentages, of two functional groups of a single chemical type, e.g. two terminal amine groups (meaning either primary, secondary, or mixtures), two terminal carboxyl groups, two terminal hydroxyl groups (again meaning primary, secondary, or mixtures), or two terminal isocyanate groups (meaning aliphatic, aromatic, or mixtures). Ranges for the percent difunctional that are preferred to meet the definition of telechelic are at least 70 or 80, more desirably at least 90 or 95 mole % of the oligomers being difunctional as opposed to higher or lower functionality. Reactive amine terminated telechelic polyamides will be telechelic polyamide oligomers where the terminal groups are both amine types, either primary or secondary and mixtures thereof, i.e. excluding tertiary amine groups.

A first portion of this invention is the substitution of polyamide segments for polyester, polyether, or polycarbonate soft segments in a polymer made from telechelic oligomers. The replacement or substitution of polyamide segments for polyester, polyether, or polycarbonate segments can be partial or complete. Optimum environmental resistance, including thermal stability, would result from complete replacement of polyester and polyether segments, due to their potential for easier chain scission in polyethers and polyesters. In some embodiments some of the polyester and or polyether segments could be retained in the telechelic polyamide or polyamide oligomer for their ability to soften the elastomeric portion or modify the compatibility of the resulting polymer with other polymer surfaces. When polymer from polyesters or polyether are degraded by hydrolysis or UV activated chain scission the molecular weight of the polymer is decreased such that the polymer, or segment, soon loses its tensile strength, elongation to break, resistance to solvents, etc.

A second benefit of the first portion of this invention, substituting soft polyamide segments for soft polyether or polyester segments, is that the polyamide segments tend to promote better wetting and adhesion to a variety of polar substrates, such as glass, nylon, and metals than polyester or polyether based polymers. The hydrophobic/hydrophilic nature of the polyamide can be adjusted by using different weight ratios of hydrocarbon to amide linkages, or nitrogen atoms, in the polyamide. Diacids, diamines, aminocarboxylic acids, and lactams with large aliphatic hydrocarbons portions relative to the amide linkage portion tend to be hydrophobic. When the hydrocarbon weight ratio to amide linkage, or nitrogen atoms, becomes smaller, the polyamide is more hydrophilic. Increasing the amount of polyamide in a polymer can increase adhesion to substrates that have similar or compatible surfaces to polyamides.

Polymers made from polyamide segments can have good solvent resistance. Solvents can cause deformation and swelling of a polymer thereby causing premature failure of the polymer. Solvents can cause a coating to swell and delaminate from a substrate at the interface between the two.

It should be noted that many of the polyamides of the prior art are high melting point crystalline polyamides such as 6-nylon, 6,6-nylon, 6,10-nylon that melt at temperatures much too high, e.g. in excess of 100° C., to serve as soft segments if a blocky thermoplastic polymer is desired. In some of the prior art publications the polyamide, often a crystalline or high Tg polyamide type, was added merely to increase the surface interaction with a substrate that was compatible to polyamides. To create a lower Tg polymer, soft (low Tg) polyester, polyether or polycarbonates were added to the polyamide segment to provide a lower composite Tg elastomeric segment. In other prior art publications only a few polyamide linkages were inserted into a polymer to modify the polarity of the polymer, to increase solvent resistance, or to raise the softening temperature.

One objective of the current patent application is to use high percentages of amide linkages in a telechelic oligomer comprised of one or more polyamide segments to provide resistance to chain scission from hydrolysis and/or UV activated chain scission. Thus, many embodiments will describe soft segments with high percentages of total linkages between repeat units in the soft segment being amide linkages. Some embodiments may allow for some linkages between repeat units to be other than amide linkages.

An important modification from conventional polyamides to get low Tg polyamide soft segments is the use of monomers with secondary amine terminal groups in forming the polyamide. The amide linkage formed from a secondary amine and a carboxylic acid type group is called a tertiary amide linkage. Primary amines react with carboxylic acid type groups to form secondary amides. The nitrogen atom of a secondary amide has an attached hydrogen atom that often hydrogen bonds with a carbonyl group of a nearby amide. The intra-molecular H-bonds induce crystallinity with high melting point and can act as crosslinks reducing chain mobility. With tertiary amide groups the hydrogen on the nitrogen of the amide linkage is eliminated along with hydrogen bonding. A tertiary amide linkage that has one additional alkyl group attached to it as compared to a secondary amide group, which has hydrogen attached to it, has reduced polar interactions with nearby amide groups when the polymer exists in a bulk polymer sample. Reduced polar interactions mean that glassy or crystalline phases that include the amide linkage melt at lower temperatures than similar amide groups that are secondary amide groups. One way to source secondary amine reactant, a precursor to tertiary amide linkages, is to substitute the nitrogen atom(s) of the amine containing monomer with an alkyl group. Another way to source a secondary amine reactant is to use a heterocyclic molecule where the nitrogen of the amine is part of the ring structure. Piperazine is a common cyclic diamine where both nitrogen atoms are of the secondary type and part of the heterocyclic ring.

Another modification to reduce the Tg of the polyamide soft segments is to use at least one additional monomer beyond the minimum number of monomers to form the polyamide. Thus, for a polyamide formed from a lactam polymerization, such as from N-methyl-dodecyl lactam one would include an additional lactam, aminocarboxylic acid, diamine, or dicarboxylic acid in the monomers for the polymerization to change the spacing (among repeat units) between the amide linkages formed by the monomer so that the spacing between the amide linkages in the polyamide is irregular along the backbone, e.g. not the same physical dimension for some of the repeat units in each oligomer. For a polymerization of aminocarboxylic acid one would include additional lactam, aminocarboxylic acid, diamine, or dicarboxylic acid (with different physical length between the primary reactive groups of the monomer) in the monomer blend for the polymerization to change the spacing among repeat units between the amide linkages. Switching end groups on the monomers can also disrupt regularity in the spacing of the polar amide linkages and lower the effective Tg of the copolymer. Thus, co-polymerizing a $C_6$ amino carboxylic acid with a small portion of a $C_6$ diacid and $C_6$ diamine can disrupt regularity of the amide linkages as the diacid and diamine units would switch the orientation of the amide linkage from head to tail orientation to tail to head orientation, slightly disrupting uniformity of spacing of the amide linkages along the polyamide backbone. Typically, when following this procedure, one would try to add a disrupting monomer that increased or decreased the number of atoms between the amide forming end groups of the monomer(s) used as the primary monomer in the polyamide. One could also use a second disrupting monomer that had a cyclic structure, such as piperazine, a cyclic diamine monomer with where two methylene atoms form the top half of the ring and two methylene atoms form the bottom half of the ring, to disrupt the regularity of polyamide formed from a diacid reacted with a diamine monomer with two methylene atoms between the nitrogen atoms of the diamine.

Another way to express the use of a copolymerization method to reduce the Tg and consequently the hardness of the polyamide is that the polyamide is characterized as being within a, b or c:

a) when said amide linkages are derived from polymerizing one or more monomers and more than 90 mole % of said monomers are derived from polymerizing monomers selected from lactam and aminocarboxylic acid monomer then said polyamide is defined as a copolymer of at least two different monomers (meaning said monomers are characterized as being at least two different monomers because they have hydrocarbyl portion of different spacing length between the amine and carboxylic acid groups, wherein each of said at least two different monomers is present at molar concentrations of at least 10%, more desirably at least 20 or 30% of the total lactam and/or aminocarboxylic acid monomers in said polyamide) or b) when said amide linkages are derived from polymerizing two or more monomers and more than 90 mole % of said monomers were derived from polymerizing dicarboxylic acid and diamine monomers then said polyamide is defined as a terpolymer of at least three different monomers (meaning said amide linkages are formed from at least three different monomers selected from the group of dicarboxylic acid and diamine monomers wherein said at least three different monomers are characterized as different from each other by a hydrocarbyl group of different spacing length between the carboxylic acid groups of the dicarboxylic acid, or different spacing length between the amine groups of the diamine, wherein each of said at least three different monomers is present at concentrations of at least 10 mole %, more desirably at least 20 or 30 mole %, of the total monomers in said polyamide), or c) with the proviso that if said amide linkages are derived from polymerizing a combination of dicarboxylic acid, diamine and either lactam and/or aminocarboxylic acid monomers such that the total dicarboxylic acid monomer(s) and the diamine monomer(s) are present in the monomer blend at concentrations of at least 10 mole %, more desirably at least 20 or 30 mole %, and the total lactam and aminocarboxylic acid monomers are present in the monomer blend at concentrations of at least 10 mole %, more desirably at least 20 or 30 mole %, then there are no restrictions requiring additional different monomers.

Generally, having nearly equal amounts of two or more different amide forming monomers results in different spacing between the amide linkages along the polyamide backbone and affords optimal reduction of the crystalline melting and glass transition temperatures. For example, a 50:50 mole blend of two different diamines would be desirable. A 50:50 mole blend of two different diacids would be desirable. A 33:33:33 mole blend of a lactam with a diacid and a diamine would be desirable.

We use the term low Tg, glass transition temperature, even though we realize most of the polyamide segments are initially low molecular weight and it would not be easily possible to measure the Tg of the low molecular weight oligomers, the measured value would be dramatically affected by molecular weight. High Tg polymers, e.g. having Tg values above 70, 80, or 90° C. as measured by differential scanning calorimetry (DSC), would tend to form solids or gels even at low molecular weights. Thus, the polyamide oligomers, telechelic polyamides, and even the oligomers from telechelic polyamides or polyamide oligomers are often described in this specification by their viscosity at specific temperatures. Low Tg polyamides oligomers will be defined as those compositions that would have Tg, if above 20,000 g/mole molecular weight, of below 50° C., more desirably below 25 or 0° C.

In one embodiment the telechelic oligomer or telechelic polyamide will have a viscosity measured by a Brookfield circular disc viscometer with the circular disc spinning at 5 rpm of less than 100,000 cps at a temperature of 70° C., more desirably less than 15,000 or 10,000 cps at 70° C., still more desirably less than 100,000 cps at 60 or 50° C., and more preferably less than 15,000 or 10,000 cps at 60° C.; and still more preferable less that 15,000 or 10,000 cps at 50° C. Desirably, these viscosities are those of neat telechelic prepolymers or polyamide oligomers without solvent or plasticizers. These viscosity values will facilitate mixing the telechelic polyamide with co-reactants and or particulate materials under suitable conditions that desirable reactions occur at reasonable rates and undesirable reactions, e.g. side reactions, do not occur to any significant extent. In some embodiments the telechelic polyamide can be diluted with solvent to achieve viscosities in these ranges.

Many of the oligomers, telechelics, and polymers of this specification are made by condensation reactions of reactive groups on desired monomer(s). Lactam polymerization into a polyamide results in similar amide linkages by a chain polymerization process and is well known in the art. These condensation reactions between carboxylic acid groups and amine or hydroxyl groups are well known and are driven by the removal of water and or catalysts. The formation of amides from the reaction of carboxylic acid groups and amine groups can be catalyzed by boric acid, boric acid esters, boranes, phosphorous acid, phosphates, phosphate esters, amines, acids, bases, silicates, and silsesquioxanes. Additional catalysts, conditions, etc. are available in textbooks such as "Comprehensive Organic Transformations" by Larock.

The condensation reaction of reactive groups will be defined as creating chemical linkages between the monomers. The portion of the monomer that is incorporated into the oligomer or polymer will be defined as the repeat unit from the particular monomer. Some monomers, such as aminocarboxylic acid, or one end of diacid reacting with one end of a diamine, lose one molecule of water as the monomer goes from a monomer to a repeat unit of a polymer. Other monomers, such as lactams, isocyanates, amines reacted with isocyanates, hydroxyl groups reacted with isocyanates, etc. do not release a portion of the molecule to the environment but rather retain all of the monomer in the resulting polymer.

We will define polyamide oligomer as a species below 20,000 g/mole molecular weight, e.g. often below 10,000; 5,000; 2,500; or 2000 g/mole, that has two or more amide linkages per oligomer. Later we will define preferred percentages of amide linkages or monomers that provide on average one amide linkage per repeat unit in various oligomeric species. A subset of polyamide oligomer will be telechelic oligomer. The telechelic polyamide has molecular weight preferences identical to the polyamide oligomer above. The term telechelic has been earlier defined. Multiple polyamide oligomers or telechelic polyamides can be linked with condensation reactions to form polymers, generally above 100,000 g/mole.

Generally, amide linkages are formed from the reaction of a carboxylic acid group with an amine group or the ring opening polymerization of a lactam, e.g. where an amide linkage in a ring structure is converted to an amide linkage in a polymer. In a preferred embodiment a large portion of the amine groups of the monomers are secondary amine groups or the nitrogen of the lactam is a tertiary amide group. Secondary amine groups form tertiary amide groups when the amine group reacts with carboxylic acid to form an amide. For the purposes of this disclosure, the carbonyl group of an amide, e.g. as in a lactam, will be considered as derived from a carboxylic acid group. The amide linkage of a lactam is formed from the reaction of carboxylic group of an aminocarboxylic acid with the amine group of the same aminocarboxylic acid. In one embodiment we want less than 20, 10 or 5 mole percent of the monomers used in making the polyamide to have functionality in polymerization of amide linkages of 3 or more. This will reduce branching in the polyamide oligomer or telechelic polyamide.

The polyamide oligomers and telechelic polyamides of this disclosure can contain small amounts of ester linkages, ether linkages, urethane linkages, urea linkages, etc. if the additional monomers used to form these linkages are useful to the intended use of the polymers. This allows other monomers and oligomers to be included in the polyamide to provide specific properties, which might be necessary and not achievable with a 100% polyamide segment oligomer. Sometimes added polyether, polyester, or polycarbonate provides softer e.g. lower Tg, segments. Sometimes it is desirable to convert the carboxylic end groups or primary or secondary amine end groups of a polyamide to other functional end groups capable of condensation polymerizations. A telechelic polyamide with carboxylic end groups can be converted into an oligomer with hydroxyl end groups by reacting the telechelic polyamide with a polyether that has two hydroxyl end groups or a polyether that has one amino, primary or secondary, and one hydroxyl end group. This is shown in Table 1, examples E, F, and G and is a preferred embodiment. Oligomers or polymers with polyether segments have susceptibility to chain breakage due to UV exposure. The effect of UV exposure on block copolymers of nylon 6-polyethylene glycol block copolymers is reported in Gauvin, Pascal; Lemaire, Jacques in Makromolekulare Chemie (1987), 188(5), 971-986. Sometimes an initiator for oligomer chain polymerization of a lactam is used that doesn't generate an amide linkage. Sometimes a polyether might be used as a segment or portion of a polyamide to reduce the Tg, or provide a soft segment, of the resulting polyamide oligomer. Sometimes a polyamide segment, e.g. possibly difunctional with carboxylic acid or amine terminal groups, can be functionalized with two polyether end segments (such as from Jeffamine™ D230) to further lower the Tg of, or provide a soft segment in, the polyamide oligomer and create a telechelic polyamide with amine or hydroxyl end groups. Sometimes a carboxylic acid terminated telechelic polyamide segment is functionalized by reacting with an amino alcohol, such as N-methylaminoethanol or HN($R^\alpha$) ($R^\beta$) where $R^\alpha$ is a $C_1$ to $C_4$ alkyl group and $R_\beta$ comprises an alcohol group and a $C_2$ to $C_{12}$ alkylene group, alternatively $R^\alpha$ and $R^\beta$ can be interconnected to form a $C_3$ to $C_{16}$ alkylene group including a cyclic structure and pendant hydroxyl group (such as in 2-hydroxymethyl piperidine), either of which can create a telechelic polyamide with terminal hydroxyl groups. The reaction of the secondary amine (as opposed to the hydroxyl group) with the carboxylic acid can be favored by using a 100% molar excess of the amino alcohol and conducting the reaction at 160° C.+/−10 or 20°. The excess amino alcohol can be removed by distillation after reaction. In one embodiment the functional primary or secondary amine groups of a telechelic polyamide are reacted with a lactone of 2 or 4 to 10 carbon atoms (e.g. a valero or caprolactone) and/or hydroxyl carboxylic acid of 3 to 30 carbon atoms to create one or two hydroxyl functional end groups derived from said lactone or said hydroxyl carboxylic acid on said telechelic polyamide. Optimally only one repeat unit from said lactone or hydroxyl carboxylic acid is added to each end of said telechelic polyamide.

As earlier indicated many amide forming monomers create on average one amide linkage per repeat unit. These include diacids and diamines when reacted with each other, aminocarboxylic acids, and lactams. When we discuss these monomers or repeat units from these monomers we generally mean these monomers, their repeat units and their reactive equivalents (meaning monomers that generate the same repeat unit as the named monomer). These reactive equivalents might include anhydride of diacids, esters of diacids, etc. These monomers, when reacted with other monomers in the same group, also create amide linkages at both ends of the repeat units formed. Thus we will use both percentages of amide linkages and mole percent and weight percentages of repeat units from amide forming monomers. Amide forming monomers will be used to refer to monomers that form on average one amide linkage per repeat unit in normal amide forming condensation linking reactions.

In one embodiment desirably at least 10 mole %, more desirable at least 25, 45 or 50, more desirably at least 55, 60, 70, 75, 80, 90, or 95 mole % of the total number of the heteroatom containing linkages connecting hydrocarbon type linkages are characterized as being amide linkages. Heteroatom linkages are linkages such as amide, ester, urethane, urea, ether linkages where a heteroatom connects two portions of an oligomer or polymer that are generally characterized as hydrocarbons (or having carbon to carbon bond, such as hydrocarbon linkages). As the amount of amide linkages in the polyamide increase the amount of repeat units from amide forming monomers in the polyamide increases.

In one embodiment desirably at least 25 wt. %, more desirable at least 30, 40, 50, more desirably at least 60, 70, 80, 90, or 95 wt. % of the polyamide oligomer or telechelic polyamide is repeat units from amide forming monomers, also identified as monomers that form amide linkages at both ends of the repeat unit. Such monomers include lactams, aminocarboxylic acids, dicarboxylic acid and diamines.

In one embodiment desirably at least 25, 50, 65, 75, 76, 80, 90, or 95 mole percent of the amide linkages in the polyamide oligomer or telechelic polyamine are tertiary amide linkages. As earlier explained tertiary amide linkages result from ring opening polymerization of lactams with tertiary amides or reactions of secondary amines with carboxylic acid groups.

Calculation of Tertiary Amide Linkage %:

The % of tertiary amide linkages of the total number of amide linkages was calculated with the following equation:

$$\text{Tertiary amide linkage \%} = \frac{\sum_{i=1}^{n}(w_{tertN,i} \times n_i)}{\sum_{i=1}^{n}(w_{totalN,i} \times n_i)} \times 100$$

where n is the number of monomers,
the index i refers to a certain monomer,
$w_{tertN}$ is the average number nitrogen atoms in a monomer that form or are part of tertiary amide linkages in the polymerizations, (note: end-group forming amines do not form amide groups during the polymerizations and their amounts are excluded from $w_{tertN}$), $w_{totalN}$ is the average number nitrogen atoms in a monomer that form or are part of tertiary amide linkages in the polymerizations (note: the end-group forming amines do not form amide groups during the polymerizations and their amounts are excluded from $w_{totalN}$), and $n_i$ is the number of moles of the monomer with the index i.

Calculation of Amide Linkage %:

The % of amide linkages of the total number of all heteroatom containing linkages (connecting hydrocarbon linkages) was calculated by the following equation:

$$\text{Amide linkage \%} = \frac{\sum_{i=1}^{n}(w_{totalN,i} \times n_i)}{\sum_{i=1}^{n}(w_{totalS,i} \times n_i)} \times 100$$

where $w_{totalS}$ is the sum of the average number of heteroatom containing linkages (connecting hydrocarbon linkages) in a monomer and the number of heteroatom containing linkages (connecting hydrocarbon linkages) forming from that monomer by the reaction with a carboxylic acid bearing monomer during the polyamide polymerizations. "Hydrocarbon linkages" are just the hydrocarbon portion of each repeat unit formed from continuous carbon to carbon bonds (i.e. without heteroatoms such as nitrogen or oxygen) in a repeat unit. This hydrocarbon portion would be the ethylene or propylene portion of ethylene oxide or propylene oxide; the undecyl group of dodecyllactam, the ethylene group of ethylenediamine, and the $(CH_2)_4$ (or butylene) group of adipic acid.

Preferred amide or tertiary amide forming monomers include dicarboxylic acids, diamines, aminocarboxylic acids and lactams. Preferred dicarboxylic acids are where the alkylene portion of the dicarboxylic acid is a cyclic, linear, or branched (optionally including aromatic groups) alkylene of 2 to 36 carbon atoms, optionally including up to 1 heteroatom per 3 or 10 carbon atoms of the diacid, more preferably from 4 to 36 carbon atoms (the diacid would include 2 more carbon atoms than the alkylene portion). These include dimer fatty acids, hydrogenated dimer acid, sebacic acid, etc. Generally we prefer diacids with larger alkylene groups as this generally provides polyamide repeat units with lower Tg value.

Preferred diamines include those with up to 60 carbon atoms, optionally including 1 heteroatom (besides the two nitrogen atoms) for each 3 or 10 carbon atoms of the diamine and optionally including a variety of cyclic, aromatic or heterocyclic groups providing that one or both of the amine groups are secondary amines, a preferred formula is

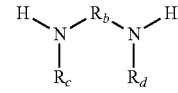

wherein $R_b$ is a direct bond or a linear or branched (optionally being or including cyclic, heterocyclic, or aromatic portion(s)) alkylene group (optionally containing up to 1 or 3 heteroatoms per 10 carbon atoms of the diamine) of 2 to 36 carbon atoms and more preferably 2 or 4 to 12 carbon atoms and $R_c$ and $R_d$ are individually a linear or branched alkyl group of 1 to 8 carbon atoms, more preferably 1 or 2 to 4 carbon atoms or $R_c$ and $R_d$ connect together to form a single linear or branched alkylene group of 1 to 8 carbon atoms or optionally with one of $R_c$ and $R_d$ is connected to $R_b$ at a carbon atom, more desirably $R_c$ and $R_d$ being 1 or 2 to 4 carbon atoms.

Such diamines include Ethacure™ 90 from Albermarle (supposedly a N,N'-bis(1,2,2-trimethylpropyl)-1,6-hexanediamine); Clearlink™ 1000 from Dorfketal, or Jefflink™ 754 from Huntsman; N-methylaminoethanol; dihydroxy terminated, hydroxyl and amine terminated or diamine terminated poly(alkyleneoxide) where the alkylene has from 2 to 4 carbon atoms and having molecular weights from about 40 or 100 to 2000; N,N'-diisopropyl-1,6-hexanediamine; N,N'-di(sec-butyl)phenylenediamine; piperazine; homopiperazine; and methyl-piperazine. Jefflink™754 has the structure

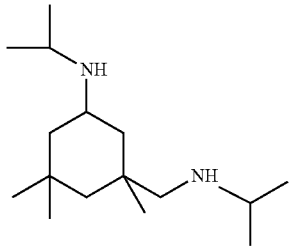 [SMILES: CC(C)NCC1(C)CC(NC(C)C)CC(C)(C)C1]

Clearlink™ 1000 has the structure

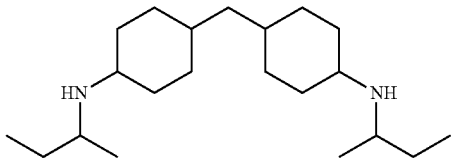 [SMILES: CCC(C)NC1CCC(CC2CCC(NC(C)CC)CC2)CC1]

Another diamine with an aromatic group is: N,N'-di(sec-butyl)phenylenediamine, see structure below:

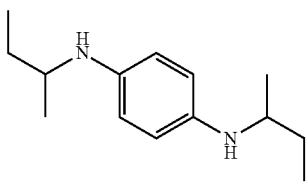 [SMILES: CCC(C)Nc1ccc(NC(C)CC)cc1]

Preferred diamines are diamines wherein both amine groups are secondary amines.

Preferred lactams include straight chain or branched alkylene segments therein of 4 to 12 carbon atoms such that the ring structure without substituents on the nitrogen of the lactam has 5 to 13 carbon atoms total (when one includes the carbonyl) and the substituent on the nitrogen of the lactam (if the lactam is a tertiary amide) is an alkyl of from 1 to 8 carbon atoms and more desirably an alkyl of 1 to 4 carbon atoms. Dodecyl lactam, alkyl substituted dodecyl lactam, caprolactam, alkyl substituted caprolactam, and other lactams with larger alkylene groups are preferred lactams as they provide repeat units with lower Tg values. Aminocarboxylic acids have the same number of carbon atoms as the lactams. Desirably the number of carbon atoms in the linear or branched alkylene group between the amine and carboxylic acid group of the aminocarboxylic acid is from 4 to 12 and the substituent on the nitrogen of the amine group (if it is a secondary amine group) is an alkyl group with from 1 to 8 carbon atoms, more preferably 1 or 2 to 4 carbon atoms. Aminocarboxylic acids with secondary amine groups are preferred.

In one embodiment desirably at least 50 wt. %, more desirably at least 60, 70, 80 or 90 wt. % of said polyamide oligomer or telechelic polyamide comprise repeat units from diacids and diamines of the structure of the repeat unit being

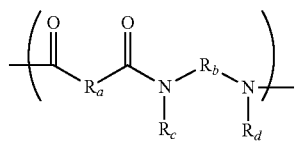

wherein $R_a$ is the alkylene portion of the dicarboxylic acid and is a cyclic, linear, or branched (optionally including aromatic groups) alkylene of 2 to 36 carbon atoms, optionally including up to 1 heteroatom per 3 or 10 carbon atoms of the diacid, more preferably from 4 to 36 carbon atoms (the diacid would include 2 more carbon atoms than the alkylene portion) and wherein $R_b$ is a direct bond or a linear or branched (optionally being or including cyclic, heterocyclic, or aromatic portion(s)) alkylene group (optionally containing up to 1 or 3 heteroatoms per 10 carbon atoms) of 2 to 36 or 60 carbon atoms and more preferably 2 or 4 to 12 carbon atoms and $R_c$ and $R_d$ are individually a linear or branched alkyl group of 1 to 8 carbon atoms, more preferably 1 or 2 to 4 carbon atoms or $R_c$ and $R_d$ connect together to form a single linear or branched alkylene group of 1 to 8 carbon atoms or optionally with one of $R_c$ and $R_d$ is connected to $R_b$ at a carbon atom, more desirably $R_c$ and $R_d$ being an alkyl group of 1 or 2 to 4 carbon atoms.

In one embodiment desirably at least 50 wt. %, more desirably at least 60, 70, 80 or 90 wt. % of said polyamide oligomer or telechelic polyamide comprise repeat units from lactams or amino carboxylic acids of the structure

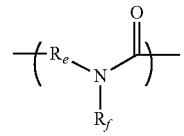

Repeat units can be in a variety of orientations in the oligomer derived from lactams or amino carboxylic acid depending on initiator type, wherein each $R_e$ independently is linear or branched alkylene of 4 to 12 carbon atoms and each $R_f$ independently is a linear or branched alkyl of 1 to 8, more desirably 1 or 2 to 4, carbon atoms.

The above described polyamide oligomers and telechelic polyamide are useful to make polymers by reacting the polyamide oligomer or telechelic polyamide with co-reactants having two or more reactive groups that can form chemical bonds when reacted with the functional groups of the polyamide oligomers or telechelic polyamide (e.g. these functional groups of the polyamide include primary and secondary amine, primary or secondary hydroxyl, or carboxylic acid group). The reactive groups on the co-reactants may be isocyanate, or with particular telechelic polyamides they could be hydroxyl, amine or carboxylic acid groups.

We made a series of polyamide oligomers from conventional difunctional acids and amines. These oligomers contained amine terminations and in reaction with diisocyanates form polyamide-polyurea backbone. The polyamide building blocks in our new dispersion polymers provide excellent hydrolytic stability, superior heat and UV resistance, and better overall mechanical properties in comparison to polyester and polyether segments. In addition, the amine chain termination in these polyamide oligomers, when reacted with isocyanates, forms urea linkages, vs. urethane link from polyol reacted with isocyanates. These polyurea linkages are known to have stronger intermolecular attractions that act more like a true crosslinked polymer, resulting in performance advantages over urethanes, including but not limited to better solvent resistance and elasticity.

Conventional Blends With Other Polymers

The polyamide oligomer or telechelic polyamide of this invention can be combined with compatible polymers and polymer dispersions by methods well known to those skilled in the art. Such polymers, polymer solutions, and dispersions include those described in A. S. Teot. "Resins, Water-Soluble" in: Kirk-Othmer Encyclopedia of Chemical Technology. John Wiley & Sons. 3rd Ed., Vol. 20, H. F. Mark et al. Eds., pp. 207-230 (1982).

Applications

The oligomeric polyamides or telechelic polyamides of the present invention are useful as components in polymer compositions used as coatings, films, fibers, adhesives, or molded or extruded goods.

Working Examples

In these examples, the following reagents were used:
Jeffamine-D230: di-primary amine-terminated polypropyleneglycol, Mn=230 g/mol.
IPA: Isopropyl alcohol
DBTL: Dibutyltin dilaurate
EC-90: Ethacure™ 90 from Albermarle N,N'-bis(1,2,2-trimethylpropyl)-1,6-hexanediamine)
PTMO-270: Poly(tetramethylene oxide) diol of about 270 g/mole molecular weight
Polyamide A
All diacids, piperazine (quantity: sum of "blocks" and "diamines" in the recipe) and the water were charged to the reactor under $N_2$ atmosphere. The reactor was heated to 100° C. and the water was evaporated. Heating was continued to 170° C. and was maintained at this temperature for 3 h. The pressure of the reactor was decreased to 1-30 mbar and the reaction was continued for an additional 10 h. The product was a slightly yellowish paste at room temperature with an acid number<3.0 mg KOH/g polymer. The end-groups were secondary amines.
Polyamide B
All diacids, EC-90 and the boric acid were charged to the reactor under $N_2$ atmosphere. The reactor was heated to 250° C. and was maintained at that temperature for 5 h. The reactor was cooled to 130° C. and the piperazine was charged to the reactor (quantity: sum of "blocks" and "diamines" in the recipe). The reactor was heated to 170° C. and the polymer was reacted for 2 h at atmospheric pressure. The pressure of the reactor was decreased to 1-30 mbar and the reaction was continued for an additional 10 h. The product was a slightly yellowish paste at room temperature with an acid number<3.0 mg KOH/g polymer. The end-groups were secondary amines.
Polyamide C
All diacids, piperazine, homopiperazine, 2-methylpiperazine and the water were charged to the reactor under $N_2$ atmosphere. The reactor was heated to 100° C. and the water was evaporated. Heating was continued to 180° C. and the reactor was maintained at this temperature for 3 h. The reactor was cooled to 130° C. and the ethylenediamine was charged to the reactor. The reactor was heated to 170° C. and the polymer was reacted for 2 h at atmospheric pressure. The pressure of the reactor was decreased to 1-30 mbar and the reaction was continued for an additional 10 h. The product was a slightly yellowish paste at room temperature with an acid number<3.0 mg KOH/g polymer. The end-groups were primary amines.
Polyamide D
All diacids, piperazine and the water were charged to the reactor under $N_2$ atmosphere. The reactor was heated to 100° C. and the water was evaporated. Heating was continued to 180° C. and this temperature was maintained for 3 h. The reactor was cooled to 130° C. and the Jeffamine-D230 was charged to the reactor. The reactor was heated to 170° C. and the polymer was reacted for 2 h at atmospheric pressure. The pressure of the reactor was decreased to 1-30 mbar and the reaction was continued for an additional 10 h. The product was a slightly yellowish paste at room temperature with an acid number<3.0 mg KOH/g polymer. The end-groups were primary amines.

TABLE 1

Polyamide oligomers

| | Polyamide | | | |
|---|---|---|---|---|
| | Polyamide A | Polyamide B | Polyamide C | Polyamide D |
| Mn g/mole | 920 | 1700 | 1780 | 1650 |
| Monomer 1 | Sebacic acid 271.5 g | Sebacic acid 202.6 g | Sebacic acid 142.6 g | Sebacic acid 94.8 g |
| Monomer 2 | Dodecanedioic acid 162.4 g | Dodecanedioic acid 109.5 g | Dodecanedioic acid 74.2 g | — |
| Monomer 3 | Hydrogenated dimer acid 387.3 g | Hydrogenated dimer acid 694.9 g | Hydrogenated dimer acid 647.3 g | Hydrogenated dimer acid 584.9 g |
| Monomer 4 | Piperazine 278.1 g | Piperazine 270.0 g | Piperazine 72.9 g | Piperazine 72.9 g |
| Monomer 5 | — | EC-90 Mw 274 103.6 g | Homopiperazine 26.3 g | Jeffamine D 230 Mn 230 302.6 g |

TABLE 1-continued

| Polyamide oligomers | | | | |
|---|---|---|---|---|
| Monomer 6 | — | — | Methyl-piperazine 55.6 g | — |
| Monomer 7 | — | — | Ethylene-diamine 60.1 g | — |
| Catalyst | — | Boric acid 1.3 g | — | — |
| Water | 350 g | 0 g | 350 g | 400 g |
| Terminal | Diamine secondary | Diamine secondary | Diamine primary | Diamine primary |
| Tg | −17.3° C. | −14.0° C. | −13° C. | −20° C. |
| Viscosity | 26,000 cps @60° C. | 55,000 cps@70° C. | — | 21,000@55° C. |
| Tertiary amide linkages % | 100% | 100% | 77% | 56% |
| Amide linkages % | 100% | 100% | 100% | 43% |

| | Polyamide | | | |
|---|---|---|---|---|
| | Polyamide E | Polyamide F | Polyamide G1 | Polyamide G2 |
| Mn g/mole | 1500 g/mole | 1700 g/mole | 450 g/mole | 1500 g/mole |
| Monomer 1 | Dodecanedioic acid 46.0 g | Sebacic acid 37.2 g | Sebacic acid 246.6 g | Polyamide G1 |
| Monomer 2 | Ethyllauryllactam 161.1 | Dodecanedioic acid 20.7 g | Dodecanedioic acid 240.6 g | |
| Monomer 3 | Lauryllactam 8.5 g | Dimer acid 183.3 g | Piperazine 92.0 g | |
| Monomer 4 | Jeffamine D230 92.0 g | Piperazine 19.8 g | | PTMO-270 503.7 g |
| Monomer 5 | — | Homo-piperazine 5.4 g | — | |
| Monomer 6 | | Methyl-piperazine 10.7 | — | |
| Monomer 7 | — | Jeffamine D230 94.7 g | — | |
| Catalyst | — | — | | 0.15 g DBTL |
| Water | 105 g | 122.5 g | 300 g | — |
| Terminal (two) | Primary amine | Primary amine | Carboxylic acid | Primary hydroxyl |
| Tg | −44° C. | −34° C. | | −41° C. |
| Viscosity | 5,000 cps@55° C. | 8,800 cps@55° C. | — | 4,000 cps@55° C. |
| Tertiary amide linkages % | 70% | 65% | 100% | 100% |
| Amide linkages % | 49% | 49% | 100% | 23% |

General procedure for Polyamide E. The backbone of the polymer was made by ring opening polymerization of lactams where the nitrogen in the amide group was partially or entirely alkylated. Endblocks were added and the mixture was kept at 170° C. for 3 h at atmospheric pressure. Vacuum was applied and the temperature was maintained for 3 h. The polymer was cooled to room temperature.

General procedure for Polyamide F: Diacids, diamines and water was heated to 200° C. for 2 h. Endblocks were added and the mixture was kept at 170° C. for 3 h at atmospheric pressure. Vacuum was applied and the temperature is maintained for 3 h. Polymer is cooled to RT.

Polyamide G1

All diacids, piperazine and the water were charged to the reactor under $N_2$ atmosphere. The reactor was heated to 100° C. and the water was evaporated. Heating was continued to 180° C. and this temperature was maintained for 3 h. The product is a white paste at room temperature with carboxylic acid end groups.

Polyamide G2

Polyamide G1 and PTMO was charged to the reactor. The reactor was heated to 180° C. and the polymer was reacted for 3 h at atmospheric pressure. The DBTL catalyst was added and the pressure of the reactor was decreased to 1-30 mbar. The reaction was continued for an additional 4 h at 180° C. and then for 4 h at 200° C. The product was a slightly yellowish paste at room temperature with an acid number<3.0 mg KOH/g polymer. The end-groups were primary alcohols.

Each of the documents referred to above is incorporated herein by reference. Except in the Examples, or where otherwise indicated, all numerical quantities in this description specifying amounts, reaction conditions, molecular weights, number of carbon atoms, etc., are to be understood as modified by the word "about." Unless otherwise indicated, all percent and formulation values are on a molar basis. Unless otherwise indicated, all molecular weights are number average molecular weights. Unless otherwise indicated, each chemical or composition referred to herein should be interpreted as being a commercial grade material which may contain the isomers, byproducts, derivatives, and other such materials which are normally understood to be present in the commercial grade. However, the amount of each chemical component is presented exclusive of any solvent or diluent, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration. All of the embodiments of the invention described herein are contemplated from and may be read from both an open-ended and inclusive view (i.e. using "comprising of" language) and a closed and exclusive view (i.e. using "consisting of" language). As used herein parentheses are used designate 1) that the something is optionally present such that monomer(s) means monomer or monomers or (meth) acrylate means methacrylate or acrylate, 2) to qualify or further define a previously mentioned term, or 3) to list narrower embodiments.

While certain representative embodiments and details have been shown for the purpose of illustrating the subject invention, it will be apparent to those skilled in this art that various changes and modifications can be made therein without departing from the scope of the subject invention.

What is claimed is:

1. A telechelic polyamide comprising:
   a) repeat units derived from polymerizing monomers connected by linkages between the repeat units and functional end groups selected from carboxyl or primary or secondary amine, wherein at least 70 mole percent of telechelic polyamide have exactly two functional end groups of the same functional type selected from the group consisting of amino or carboxylic end groups;
   b) a polyamide segment comprising at least two amide linkages characterized as being derived from reacting an amine with a carboxyl group, and said polyamide segment comprising repeat units derived from polymerizing two or more of monomers selected from lactams, aminocarboxylic acids, dicarboxylic acids, and diamines;
   c) wherein at least 10% of the total number of the heteroatom containing linkages connecting hydrocarbon type linkages are characterized as being amide,
   d) wherein at least 25% of the amide linkages are characterized as being tertiary amide linkages, and
   e) wherein at least 60 wt. % of said telechelic polyamide segment comprises repeat units of the structure

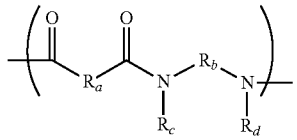

wherein $R_a$ is the alkylene portion of the dicarboxylic acid and is a cyclic, linear, or branched alkylene of 2 to 36 carbon atoms, optionally including up to 1 heteroatom per 3 or 10 carbon atoms of the diacid, and wherein $R_b$ is a linear or branched alkylene of 2 to 60 carbon atoms and optionally being or including cyclic, heterocyclic, alkylene group and optionally containing up to 1 or 3 heteroatoms per 10 carbon atoms; and $R_c$ and $R_d$ connect together to form a single linear or branched alkylene group of 1 to 8 carbon atoms.

2. A telechelic polyamide according to claim 1, wherein at least 76% of said amide linkages are characterized as tertiary amide linkages and said polyamide portion is characterized as being within a), b) or c);

a) when said amide linkages are derived from polymerizing amide forming monomers and at least 90 mole % of said amide forming monomers were selected from the group consisting of a lactam and aminocarboxylic acid monomers then said polyamide is defined as a copolymer of at least two different monomers,
b) when said amide linkages are derived from polymerizing amide forming monomers and at least 90 mole % of said amide forming monomers were combined amounts of dicarboxylic acid and diamine monomers then said polyamide is defined as a terpolymer of at least three different monomers, or
c) when said amide linkages are derived from polymerizing a combination of dicarboxylic acid, diamine and either lactam and/or aminocarboxylic acid monomers such that the total dicarboxylic acid monomer(s) and the diamine monomer(s) are present at 10 mole % or more and the total lactam and aminocarboxylic acid monomers are present in the monomer blend at 10 mole % or more, then there are no restrictions requiring additional different monomers.

3. A telechelic polyamide, according to claim 1, wherein the total repeat units derived from monomers selected from the group of said lactam, aminocarboxylic acid, dicarboxylic acid, and diamine in said amide linkages in said telechelic polyamide comprises at least 50 wt. % of said telechelic polyamide.

4. A telechelic polyamide according to claim 1, wherein the total repeat units derived from monomers selected from the group of said lactam, aminocarboxylic acid, dicarboxylic acid, and diamine; in said amide linkages in said polyamide segment comprises at least 80 wt. % of said telechelic polyamide.

5. A telechelic polyamide, according to claim 1, wherein at least 70 wt. % of said telechelic polyamide segment comprises repeat units of the structure

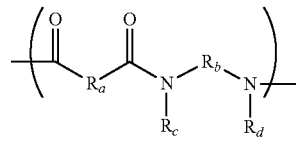

wherein $R_a$ is the alkylene portion of the dicarboxylic acid and is a cyclic, linear, or branched alkylene of 2 to 36 carbon atoms, optionally including up to 1 heteroatom per 3 or 10 carbon atoms of the diacid, and wherein $R_b$ is a linear or branched of 2 to 60 carbon atoms and optionally being or including cyclic, heterocyclic, alkylene group and optionally containing up to 1 or 3 heteroatoms per 10 carbon atoms; and $R_c$ and $R_d$ connect together to form a single linear or branched alkylene group of 1 to 8 carbon atoms.

6. A telechelic polyamide, according to claim 5, wherein said

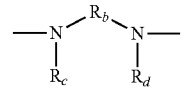

unit is derived from polymerizing piperazine.

7. A telechelic polyamide, according to claim 1, having functional end groups, wherein at least 80 mole % the functional end groups are secondary amine groups.

8. A telechelic polyamide, according to claim 1, having functional end groups, wherein at least 80 mole % the functional end groups are primary amine groups.

9. A telechelic polyamide, according to claim 1, wherein the telechelic polyamide has a weight average molecular weight from about 200 to 10,000 g/mole.

10. A telechelic polyamide, according to claim 1, wherein the telechelic polyamide has a weight average molecular weight from about 200 to 5,000 g/mole.

11. A telechelic polyamide, according to claim 9, wherein said telechelic polyamide without solvents has viscosity of less than 100,000 cps at 70° C. as measured by a Brookfield circular disc viscometer with the circular disc spinning at 5 rpm.

12. A telechelic polyamide, according to claim 9, wherein said telechelic polyamide without solvents has viscosity of less than 100,000 cps at 60° C. as measured by a Brookfield circular disc viscometer with the circular disc spinning at 5 rpm.

13. A telechelic polyamide, according to claim 1, wherein said telechelic polyamide further comprises at least one oligomer segment selected from the group of a polyester segment, a polyether segment, and a polycarbonate segment.

14. A telechelic polyamide comprising:
a) two functional end groups selected from hydroxyl, carboxyl, or primary or secondary amine;
b) a polyamide segment comprising at least two amide linkages characterized as being derived from reacting an amine with a carboxyl group, and said polyamide segment comprising repeat units derived from polymerizing two or more of monomers selected from lactams, aminocarboxylic acids, dicarboxylic acids, and diamines; wherein at least 2-5.65% of the amide linkages are derived from reacting a secondary amine group with a carboxyl group, and said telechelic polyamide is characterized as a liquid with a viscosity of less than 100,000 cps at 70° C. as measured by a Brookfield circular disc viscometer with the circular disc spinning at 5 rpm and
c) wherein at least 60 wt. % of said telechelic polyamide segment comprises repeat units of the structure

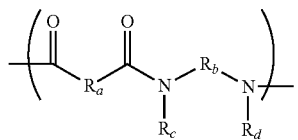

wherein $R_a$ is the alkylene portion of the dicarboxylic acid and is a cyclic, linear, or branched alkylene of 2 to 36 carbon atoms, optionally including up to 1 heteroatom per 3 or 10 carbon atoms of the diacid, and wherein $R_b$ is a linear or branched alkylene of 2 to 60 carbon atoms and optionally being or including cyclic, heterocyclic, alkylene group and optionally containing up to 1 or 3 heteroatoms per 10 carbon atoms; and $R_c$ and $R_d$ connect together to form a single linear or branched alkylene group of 1 to 8 carbon atoms.

15. A telechelic polyamide, according to claim 14, wherein said telechelic polyamide is characterized by a weight average molecular weight from about 200 to 10,000 g/mole and comprises a diversity of amide forming repeating units disrupting hydrogen bonding between amide components.

16. A telechelic polyamide, according to claim 14, wherein said two functional end groups are selected from the group consisting of primary or secondary amine groups.

17. A telechelic polyamide, according to claim 14 wherein said telechelic polyamide is characterized by having two terminal carboxyl groups.

18. A telechelic polyamide according, to claim 1, wherein at least 80 wt. % of said telechelic polyamide segment comprises repeat units of the structure

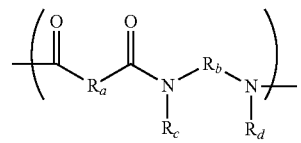

wherein $R_a$ is the alkylene portion of the dicarboxylic acid and is a cyclic, linear, or branched alkylene of 2 to 36 carbon atoms, optionally including up to 1 heteroatom per 3 or 10 carbon atoms of the diacid, and wherein $R_b$ is a linear or branched alkylene of 2 to 60 carbon atoms and optionally being or including cyclic, heterocyclic, alkylene group and optionally containing up to 1 or 3 heteroatoms per 10 carbon atoms; and $R_c$ and $R_d$ connect together to form a single linear or branched alkylene group of 1 to 8 carbon atoms.

19. A telechelic polyamide according, to claim 1, wherein at least 90 wt. % of said telechelic polyamide segment comprises repeat units of the structure

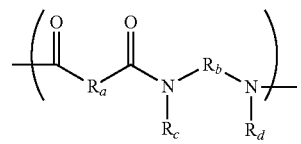

wherein $R_a$ is the alkylene portion of the dicarboxylic acid and is a cyclic, linear, or branched alkylene of 2 to 36 carbon atoms, optionally including up to 1 heteroatom per 3 or 10 carbon atoms of the diacid, and wherein $R_b$ is a linear or branched alkylene of 2 to 60 carbon atoms and optionally being or including cyclic, heterocyclic, alkylene group and optionally containing up to 1 or 3 heteroatoms per 10 carbon atoms; and $R_c$ and $R_d$ connect together to form a single linear or branched alkylene group of 1 to 8 carbon atoms.

* * * * *